United States Patent

Balakrishnan et al.

[11] Patent Number: 5,982,436
[45] Date of Patent: Nov. 9, 1999

[54] METHOD FOR SEAMLESS SPLICING IN A VIDEO ENCODER

[75] Inventors: Mahesh Balakrishnan, Briarcliff Manor; Cedric Caron, Ossining, both of N.Y.

[73] Assignee: Philips Electronics North America Corp., New York, N.Y.

[21] Appl. No.: 08/829,124

[22] Filed: Mar. 28, 1997

[51] Int. Cl.$^6$ .................................................. H04N 7/32
[52] U.S. Cl. ........................ 348/409; 348/419; 348/700
[58] Field of Search ........................... 348/12, 384, 390, 348/400–402, 409–412, 413, 415, 416, 419, 420, 423, 584, 699, 700, 845; 382/232, 236, 238; H04N 7/32

[56] References Cited

U.S. PATENT DOCUMENTS

| 5,495,291 | 2/1996 | Adams | 348/402 |
| 5,717,464 | 2/1998 | Perkins et al. | 348/419 |
| 5,742,347 | 4/1998 | Kandlur et al. | 348/409 |
| 5,754,239 | 5/1998 | Wilkinson | 348/415 |
| 5,793,431 | 8/1998 | Blanchard | 348/423 |
| 5,859,660 | 1/1999 | Perkins et al. | 348/584 |
| 5,864,682 | 1/1999 | Porter et al. | 348/12 |
| 5,911,008 | 6/1999 | Niikura et al. | 382/236 |

*Primary Examiner*—Richard Lee

[57] ABSTRACT

A method of achieving seamless switching of digitally compressed signals. The method includes the steps of identifying the point in a video signal where splicing to a second video signal is desired, and thereafter, maintaining adherence to certain parameters in the encoder buffer to ensure that the input signal is not being compressed at a rate that causes either underflow or overflow in the encoder buffer. The method also includes the steps of constraining the upper bound of the encoder buffer to ensure that data is not being outputted from the encoder buffer to the decoder buffer too slowly so as to cause an underflow of data in the decoder buffer. The method may also include the steps of constraining the lower bound of the encoder buffer to ensure that data is not being outputted from the encoder buffer to the decoder buffer too quickly so as to cause an overflow of data in the decoder buffer.

2 Claims, 6 Drawing Sheets

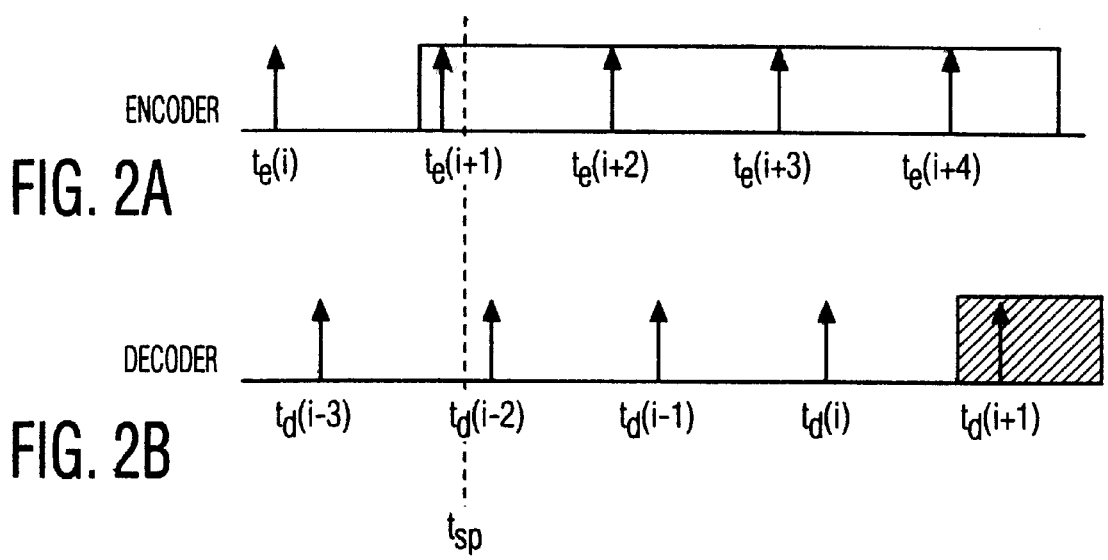
FIG. 2A
FIG. 2B
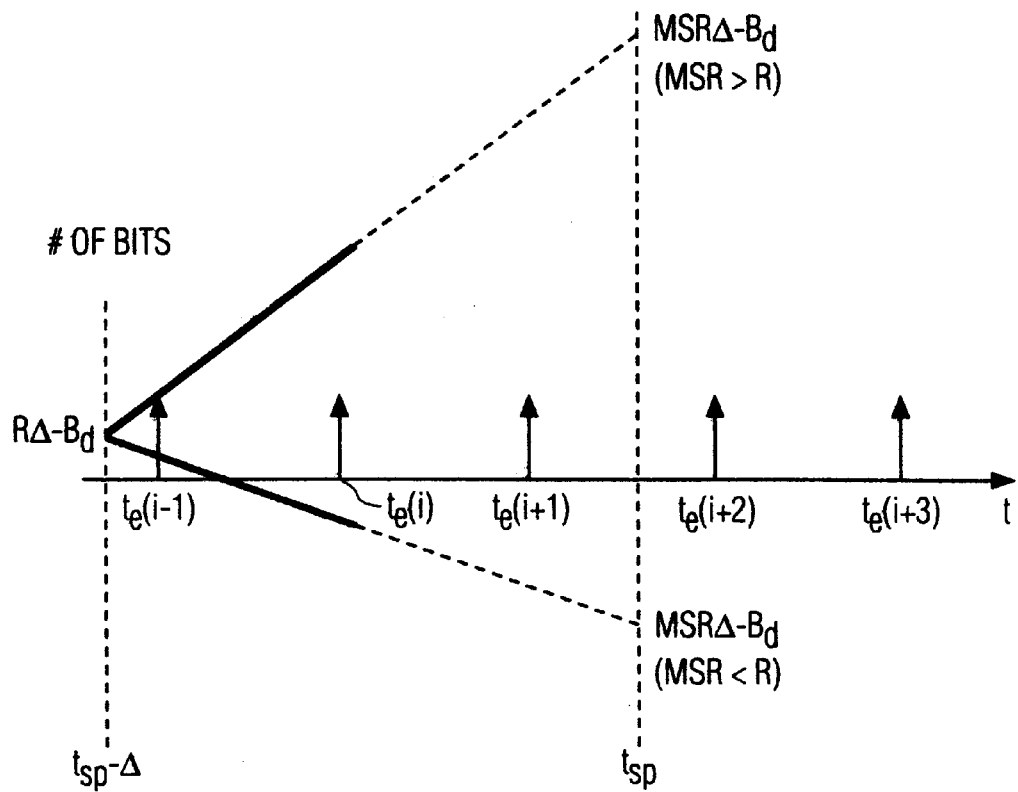
FIG. 3

METHOD FOR SEAMLESS SPLICING IN A VIDEO ENCODER

This invention was made with United States Government support under Cooperative Agreement No. 70NANB5H1174 awarded by the National Insititute For Standards and Technology (NIST). The United States Government has certain rights in the invention.

BACKGROUND OF THE INVENTION

1. Field of the Invention

The present invention relates generally to video encoders and decoder systems, and in particular, to a method of splicing compressed video pictures from selected encoder sources to achieve seamless switching.

2. Description of the Related Art

Television studios today typically process noncompressed, analog video. Video signals in the analog domain in a television studio are all synchronized, that is, the starting, running and ending times of each video picture is the same. Since each picture starts at the same time, switching from one analog encoder to another analog encoder requires the simple procedure of monitoring the end of a video picture in the first encoder since the beginning and end of each picture of each video signal is synchronized with the beginning and end of each picture in the second encoder. Since there is synchronization, switching out of one picture at the end thereof automatically places the video at the beginning of a picture in the other selected video signal. Therefore, switching, for example, from one video source (showing for example, a television network program) to another video source (showing for example, a local affiliate's commercial) when using analog (and therefore synchronized) signals, is relatively simple and well known.

Switching in the digital domain however, introduces additional obstacles that must be overcome. Generally, a video source may be transmitting either digitally and uncompressed, or digitally and compressed, video signals. In the first situation where the digital signal is uncompressed, switching is still relatively simple since the signals again can be easily synchronized as is well known in the art. In this way, switching from one video encoder source to a second video encoder source when dealing with digitally uncompressed signals is similar to the methods found when switching in the analog domain.

However, with the introduction of HDTV and other high resolution display devices, there is an increasing desire to transmit and broadcast compressed digital video signals to effectively operate over the necessary wider bandwidth. One known standard for transmitting in the compressed digital domain is MPEG. MPEG represents a compressed video picture by a number of bits. However, the difficulty is that the particular number of bits for each picture can vary. That is, the number of bits representing one video picture has little correlation to the number of bits representing the next video picture. Therefore, editing and switching between video sources, as illustrated above, of digitally compressed video signals becomes very difficult because it is necessary to establish a smooth and accurate splicing time between the selected video sources.

The MPEG standard does not set forth a solution to this problem. Although MPEG is a variable rate encoding standard, the output of many MPEG encoders must be transmitted over a channel (for example, over a television network) using a different rate that depends on the channel and system characteristics.

Therefore in such a system, the encoder formats data in a variable manner while the transmission system is capable of only transmitting the video data bits at a different bit rate. Therefore, without some sort of "buffer" to manage the flow of video data, problems will arise. The MPEG standard along with the state of the art encoder/decoder systems recognizes this problem. One suggested technique to solve the problem is the introduction of an encoder buffer disposed between the encoding system (but which may still be part of the encoder) and the channel. The buffer is constructed to smooth the variable rate of data generated by the encoder to the bit rate that can be transmitted over the channel and to the decoder. This buffer has been coined an encoder buffer.

However, the introduction of the aforementioned encoder buffer introduces a still further significant problem. That is, there must be buffer management to manage the data flow within the encoder buffer to make sure it does not overflow with video data. That is, if data is entering the encoder buffer too quickly as compared to the rate at which it is outputted to the channel, the encoder buffer will at some point overflow with data. This will cause a loss of video data which may not subsequently be recapturable. On the other hand, if the data entering the encoder buffer is entering at a very low rate, i.e. slower than the rate at which it is being outputted to the channel, there may be an underflow of data at the encoder.

The decoder has a decoder buffer that gets data from the channel and has data taken out periodically by the decoder. Decoder buffer underflow and overflow causes unacceptable artifacts. The encoder buffer must therefore be managed in such a way as to ensure that the decoder buffer does not underflow or overflow.

Another suggested method of achieving seamless splicing of compressed digital video is to decompress the video signal, switch the video from the first selected encoder to the second selected encoder in a known manner, and then again reencode the video. However, this method is extremely expensive, requiring additional circuitry, because it requires decompression of the video, switching thereof, and thereafter, recompression. Moreover, because switching in this manner requires the encoding and decoding of a video signal twice, there may be an appreciable reduction in the video signal quality.

Therefore, an improved method of switching between two or more selected encoders (which are transmitting digitally compressed video) to achieve at least essentially seamless splicing and overcome the aforementioned deficiencies and disadvantages is desired.

SUMMARY OF THE INVENTION

Generally speaking, in accordance with the invention, a method of preventing data loss in a system during the switching of a signal from a first encoder source to a second encoder source is provided. In a preferred embodiment, the method includes the steps of identifying a splice point representing the point in time when the decoder is switched from the first encoder source to the second encoder source and providing a buffer in the first encoder source such that $$E((t_e(j))^-) \geq \int_{t_e(j)}^{t_{sp}} R(u)du - B_d + MSR \cdot (t_d(j) - t_{sp})$$

for j such that $j \leq i$ and $t_e(j) \geq (t_{sp} - \Delta)$. Additionally, the method may also include the step of ensuring that the number of data bits in the first encoder buffer is less than or equal to:

$$E(t) \leq \int_{t}^{t_{sp}} R(u)du, \quad \text{where} \quad t_e(i)^+ \geq t \geq t_{sp} - \Delta.$$

Also in accordance with the present invention, a method of splicing data in a system that includes two encoder sources coupled to a decoder is provided. The method preferably includes the steps of identifying an upcoming group of pictures to be encoded in the first encoder source, identifying a splice point representing the point in time when the decoder is switched from the first encoder source to the second encoder source, estimating the number of bits in an encoder buffer located in the encoder at $t_e(i)^+$, where $E(t_e(i)^+)$ is the number of bits in the encoder buffer right after the i'th picture has been encoded, determining whether the total number of bits in the encoder buffer satisfies the constraints:

$$E((t_e(j))^-) \geq \int_{t_e(j)}^{t_{sp}} R(u)du - B_D + MSR \cdot (t_d(j) - t_{sp})$$

for j such that $j \leq i$ and $t_e(j) \geq (t_{sp} - \Delta)$ and $$E(t) \leq \int_{t}^{t_{sp}} R(u)du, \quad \text{where} \quad t_e(i)^+ \geq t \geq t_{sp} - \Delta$$

and based on this determination, either increasing or decreasing the total number of bits allocated to the group of bits.

Still further, in accordance with the present invention, a method of picture accurate splicing when the last picture in display order prior to a splice point is an I, B or P picture is provided. If the last picture is an I or P picture, the preferable method includes the steps of identifying the last picture in display order prior to a splice point, determining the number of pictures in the current GOP containing the identified picture, determining if the number of pictures in the current GOP is less than a threshold and if so, concatenating the current GOP with a previous GOP and terminating the current GOP with the identified picture if the splice point is a splice-in-point. If the last picture is a B picture, the preferable method also includes the step of changing the type of the identified last picture to one of an I or P picture after the step of identifying the last picture in display order prior to the splice point.

Accordingly, it is an object of the invention to provide an improved method of switching between selected encoders which are transmitting digitally compressed video.

Another object of the present invention is to provide an improved system that incorporates the aforementioned improved method.

It is another object of the invention to enable a concatenation of compressed bit streams.

Another object of the present invention is to provide an improved switching method that does not require an extensive amount of processing.

Still another object of the present invention is to provide a method of seamless splicing that requires a minimum amount of circuitry.

A further object of the present invention is to provide a method of achieving seamless splicing that maintains the quality of the video signal.

A still further object of the present invention is to provide a method of seamless splicing adaptable for and meeting all the requirements of MPEG.

Still other objects and advantages of the invention will in part be obvious and will in part be apparent from the specification.

The invention accordingly comprises the several steps and the relation of one or more of such steps with respect to each of the others, the apparatus embodying features of construction, combination of elements, and arrangement of parts which are adapted to effect such steps, all as exemplified in the detailed disclosure hereinafter set forth, the scope of the invention being indicated in the claims.

BRIEF DESCRIPTION OF THE DRAWINGS

For a better understanding of the invention, reference is made to the following drawings which are to be taken in conjunction with the detailed description.

FIGS. 2A and 2B is a timing chart illustrating the encoding and decoding sequences of selected video pictures in a system constructed in accordance with the present invention;

FIG. 3 is a graph illustrating a preferred method of calculating the lower occupancy boundary of an encoder buffer to prevent underflow therein and to prevent overflow in the decoder buffer, all of which are constructed in accordance with the present invention;

DETAILED DESCRIPTION OF THE PREFERRED EMBODIMENTS

Figure 1:
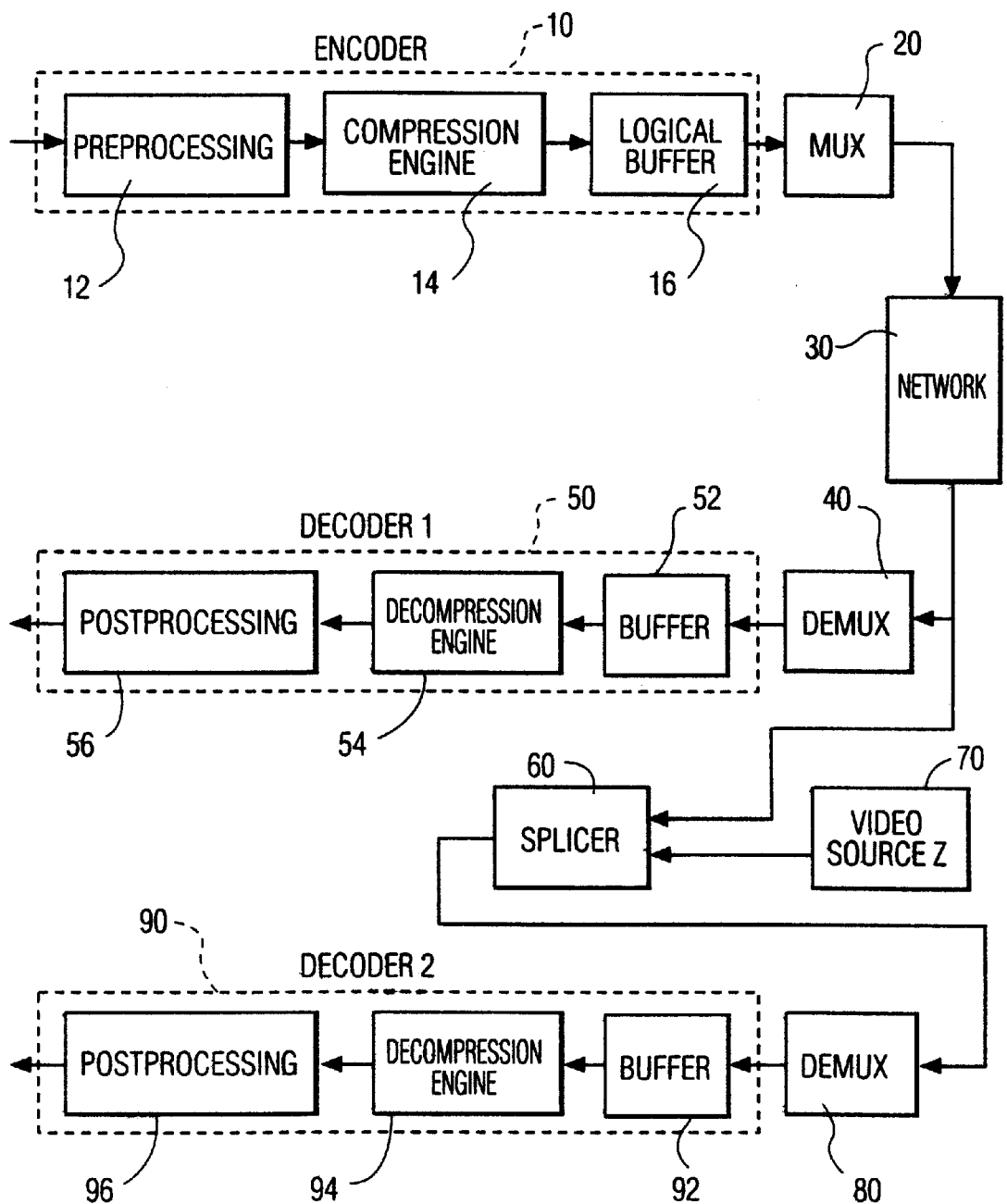
FIG. 1 is a diagram of a system constructed in accordance with the present invention.

Reference is first made to FIG. 1 which depicts the preferable configuration of a video encoder/decoder arrangement in accordance with the present invention. As illustrated in FIG. 1, the arrangement includes an encoder 10 for encoding video coupled to a mux 20. The output of mux 20 is coupled to an input of a network 30. By way of example, network 30 may be a television studio network, an over the air channel or the like. The output of network 30 is coupled to both a demux 40 and a splicer 60. The output of demux 40 is provided as the input to a first decoder 50. In the preferred embodiment, decoder 50 includes a buffer 52 coupled to a decompression engine 54, which itself is coupled to a postprocessor 56. A video source 70, is provided in the preferred embodiment, its function to be described below. The output of video source 70 is coupled to the input of splicer 60. A second demux 80 has its input coupled to the output of splicer 60. The output of demux 80 is coupled to the input of a second decoder 90. Similar to decoder 50, decoder 90 preferably includes a buffer 92 coupled to a decompression engine 94, which itself is coupled to a postprocessor 96.

It is understood that the configuration set forth in FIG. 1 is illustrative and modifications or changes may be made thereto while still remaining within the scope of the invention. The present configuration is provided to highlight the advantages and features of the present invention, all of which will be described below in further detail.

Reference is now made to encoder 10 in greater detail. In the preferable encoder configuration, encoder 10 includes a preprocessor 12 for preprocessing the video, a compression engine 14, coupled to the output of preprocessor 12, for compressing the video signal in a known manner, and a logical buffer 16, coupled intermediate the output of compression engine 14 and the output of encoder 10.

The unit for signal input into compression engine 14 is a picture (either a field or a frame). The picture indexed by j enters preprocessor 12 where it is preprocessed and is then outputted to compression engine 14 of encoder 10. At the encode time $t_e(j)$, the video picture is instantaneously compressed and all of the data that constitutes the video picture compressed at encode time $t_e(j)$ is input to logical buffer 16. It is preferable that this transmission of the video picture from compression engine 14 to buffer 16 also occurs instantaneously. It is to be understood that logical buffer 16 is not a physical buffer of encoder, which can be much larger. The rate at which the compressed data leaves buffer 16 of encoder 10 is specified by R(t). It is understood in the real implementation, an encoder may not encode a picture instantaneously. This requires slight modifications to the buffer control which can be done using techniques that are known to one of ordinary skill in the art.

It is assumed that there is zero delay in network 30. If the delay is not zero, the delay can be compensated for by techniques that are known to one ordinarily skilled in the art. As depicted in FIG. 1, the compressed video picture enters the decoder buffer 50 at the rate (R(t)) at which the compressed video picture leaves encoder buffer 16. All of the data that belongs to the picture indexed by j is instantaneously removed from decoder buffer 50 and decoded at the time $t_d(j)$ specified by the DTS (decode time stamp) of the picture. In the preferred embodiment, $t_d(j)-t_e(j)=\Delta$, where $\Delta$ is end to end buffer delay. That is, the delay in buffer 16 and buffer 52.

As illustrated in FIG. 1, the output of encoder 10 is transmitted to either decoder 50 or 90. In the first case, the datastream produced by encoder 10 is outputted to splicer 60. Splicer 60 preferably has two inputs, one of which is coupled to the output of video source 70. Splicer 60 feeds one of the two inputs (from network 30 or video source 70) to it's output after some manipulation of the datastream. The output of splicer 60 is coupled to decoder 90. In a second case, the output of encoder 10 reaches decoder 50. Since both of these transmissions are being considered, encoder 10 has to ensure that a compliant MPEG-2 data stream is delivered to both decoders 50 and 90.

In the preferred embodiment, it is desirable that the complexity of the bitstream manipulation in splicer 60 be low. If the particular splicing constraints specified by MPEG-2 as discussed further below are satisfied, the splicing or switching operation will be achieved. The point in the bitstream at which these constraints are satisfied will be hereinafter referred to as the splice point $t_{sp}$. At $t_{sp}$, splicer 60 can switch to another video bitstream at a point where it satisfies similar constraints. To achieve seamless splicing, encoder 10 must satisfy the MPEG-2 splicing constraints around the splice point $t_{sp}$. However, it must be understood that not all seamless splice points will actually be spliced upon. Therefore, encoder 10 also needs to ensure that the stream it produces is MPEG-2 compliant even in the absence of splicing.

Encoder Buffer Management

In order to prevent decoder buffer underflow and overflow, the following equation has to be satisfied for all time (t):

$$E(t) \le \int_{t}^{t+\Delta} R(u)du \le B_d + E(t) \qquad (1)$$

wherein:
a) The size of the decoder buffer is $B_d$.
b) The number of bits in logical buffer 16 at time (t) is E(t).
c) The number of bits in decoder buffer 52 at time (t) is D(t).
d) The number of bits used in encoding the j'th picture is b(j).
e) The rate at which data is removed from encoder buffer 16 is R(t).
f) The end to end buffer delay from encoder 10 to it's associated decoder 50 is $\Delta$.

As will be clear from the above equation, the number of bits in buffer 16 at a particular point in time (t) must be less than or equal to the number of bits outputted from encoder buffer 16 from the particular point in time (t) up to delta ($\Delta$) seconds into the future. Therefore, if, for example, there is one megabyte of data in buffer 16 at time (t), the number of bits that can be removed from buffer 16 in the next delta ($\Delta$) seconds must be greater than or equal to one megabyte. Otherwise it is clear that data is being removed too slowly from the encoder buffer 16 causing both overflow in encoder 10 and underflow in decoder 50.

Therefore if the number of bits in encoder 10 is always less than the number of bits that will be removed from buffer 16 in the next delta ($\Delta$) seconds, any bit of data in buffer 16 will be removed by the time the next delta ($\Delta$) seconds elapses and will reach decoder buffer 56.

From the instant encoder 10 encodes a certain picture (j), within a certain period of time, picture (j) must be decoded; that is, it must be at least in decoder buffer 56. In terms of encoder buffer management, when a picture (j) is encoded, within delta ($\Delta$) seconds, the last bit of picture (j) must be out of encoder buffer 16. Satisfying equation (1) ensures this result because if there is any data in encoder buffer 16, it will be outputted within delta ($\Delta$) seconds, and therefore, it will have reached decoder buffer 56. In this way, decoder buffer underflow is avoided.

The second inequality illustrated by equation 1 provides that the number of bits transmitted in the next delta ($\Delta$) seconds minus the number of bits in the encoder buffer at the particular point in time (t), is less than the size of decoder buffer 56. Satisfying this inequality ensures that decoder buffer 56 does not overflow, that is, that the encoded data does not arrive at the decoder buffer too soon. Therefore it is apparent that overflow in the decoder buffer 56 means there is underflow in encoder buffer 16 and likewise in a mirror image, any underflow in encoder buffer 16 means there is overflow in decoder buffer 56.

Reference is now made to FIG. 2 which more particularly depicts the timing of encoding and decoding in the present invention and the encoding and decoding instances of the pictures that are encoded by encoder 10. The time associated with the splice point is denoted $t_{sp}$ which is the time when switching occurs from encoder 10 to video source 70, for example. Because of the inherent known characteristics of encoder buffer 16, there is a delay between the time when encoder 10 actually produces the data and the time when the data leaves encoder buffer 16.

At the splice point $t_{sp}$, the input to decoder 90 is switched away from encoder 10 to video source 70. The last picture from the encoder 10 that is completely removed from encoder buffer 16 prior to the splice point $t_{sp}$ is denoted as i. Therefore, $t_{sp}$ is the time at which the last byte of data from the i'th picture leaves encoder buffer 16. The encode-time of the i'th picture is denoted by time $t_e(i)$ and its decode time by $t_d(i)$. Note that encoder 10 can encode one or more pictures (i.e., (i+1), (i+2)) following the encoding of the i'th picture prior to splice point $t_{sp}$. However, these pictures (i+1), (i+2) do not pass splicer 60 since splicer 60 splices at the splice point $t_{sp}$. Thus the pictures encoded at the times that fall within the shaded box in FIG. 2A do not reach decoder 90. However, if applicable, pictures (i+1), (i+2) . . . would reach decoder 50. Thus, the pictures decoded by decoder 90 at the times that are in the shaded box in FIG. 2B are pictures from video source 70. From a display-standpoint, the output of encoder 10 gets spliced between pictures i and i+1.

In MPEG-2, two parameters that define seamless splicing are known as the splice_decoding_delay (SDD) and the max_splice_rate (MSR). In FIG. 2, the splice_decoding_delay (SDD) is equal to $t_d(i+1)-t_{sp}$. For the time period prior to $t_{sp}$, decoder buffer control is no different from that wherein there is no splicing. However, the critical time period is that from $t_{sp}$ until $t_d(i)$, when data from two sources (encoder 10 and video source 70) co-exist in decoder buffer 92. During this time period, decoder buffer underflow is not applicable, since all of the data from encoder 10 that precedes the splice point $t_{sp}$ is already in decoder 90. However, to avoid decoder buffer overflow, the critical time period is the time instances $t_d(j)^-$ which denotes a time just prior to the decoding of picture j. It is necessary to consider all pictures j decoded at time $t_d(j)$ greater than $t_{sp}$ such that j is less than or equal to i. Specifically, it is essential that there is no encoder buffer underflow during the time $t_e(i) \geq t \geq t_{sp}-\Delta$, wherein the i'th picture is the last picture encoded immediately before the splice point, the (i+1)'th picture is the next picture encoded immediately after the splice point and the j'th can represent any picture.

Referring now to FIG. 3, $t_e(i-1)$, $t_e(i)$, $t_e(i+1)$, $t_e(i+2)$ are the points in time when each successive picture is being encoded. Therefore, and similar to the corresponding sequence in an analog television, after the particular picture is encoded, the data created is placed in the encoder buffer. As illustrated, the spikes $t_e(i)$, $t_e(i+1)$, $t_e(i+2)$ are separated by constant intervals, for example ⅓₀ seconds (for a frequency of 30Hz). In general the spikes need not be separated by constant intervals.

So although the splice point is designated by the dotted line in FIG. 3, the splice point can be considered to represent the point in time when the last bit of data in a particular picture leaves the encoder buffer, because the switching takes place between pictures. That is, the defined splice point does not correspond to the point at when the last picture is encoded because the last picture is encoded at a point in time before the splice point.

The last encoded picture is encoded at time $t_e(i)$. At $t_e(i+1)$, the (i+1)'th picture is encoded by the encoder after the last picture prior to the splice point because additional pictures may be encoded after a splice point. That is, just because a splice point is inserted does not mean a switch must be effectuated, but only that the option to cleanly switch is available.

As depicted in FIG. 3, the lower bound of encoder buffer 16 is Max(0, $R\Delta-B_d$) which is the rate at which the encoder buffer is being emptied multiplied by the end to end delay ($\Delta$) minus the decoder buffer size. This is the minimum lower bound for which the encoder buffer should never fall below. If the encoder buffer falls below this value, there will be encoder underflow which will result at some later point in time, decoder overflow.

Therefore, if you know MSR and SDD, FIG. 3 illustrates that the lower bound of buffer 16 changes from Max(0,$R\Delta-B_d$) to a Max(0, $(MSR)\Delta-B_d$) If the lower bound is less than zero, by definition, there will be no underflow and there will be no concern with respect to the encoder buffer management.

Decoder Buffer Overflow

Referring still to FIG. 3, which illustrates in greater detail the constraints on the lower bounds on encoder buffer 16 so as to prevent underflow therein, $t_{sp}$ is the splice point at which the video is switched from encoder 10 to video source 70 in FIG. 1. Because of the existence of buffer 16, there is a delay between the time the encoder 10 actually produces the data and when it leaves encoder buffer 16. For purposes of the invention disclosed herein, it is permissible to assume that the pictures are instantaneously encoded. Therefore at a particular point, as in a corresponding analog encoder, the encoder instantaneously encodes the entire i'th picture and the data produced thereby is placed into encoder buffer 16. Moreover, the encode points are separated by a constant value, for example, intervals of ⅓₀ sec. if for example, the signal is being transmitted at 30Hz.

The number of bits in the decoder buffer at time $t_d(j)^-$ is given by $$D(t_d(j)^-) = D(t_{sp}) + MSR \cdot (t_d(j) - t_{sp}) - \sum_{\substack{k \leq j-1 \\ t_d(k) \geq t_{sp}}} b(k) \qquad (2)$$

where MSR is the max_splice_rate variable of MPEG-2 and b(k) is the number of bits used to code picture k. In this example, the worst case scenario for source 70 is assumed. The summation involving b(k) in the expression 2 is over all those pictures that are decoded between $t_{sp}$ and $t_d(j)^-$. The right hand side of the above expression needs to be less than $B_d$. This provides a constraint on decoder buffer 90. To convert this constraint to one on encoder buffer 16, the following equation expresses the relationship between decoder buffer 92 and encoder buffer 16:

$$D(t + \Delta) = \int_t^{t+\Delta} R(u)du - E(t) \leq B_d. \qquad (3)$$

The eventual constraint on the encoder buffer 16 occupancy is, $$E(t_e(j)^-) \geq \int_{t_e(j)}^{t_e(j)+\Delta} R(u)du - B_d, \qquad (4)$$

$$E(t_e(j)^-) \geq \int_{t_e(j)}^{t_{sp}} R(u)du - B_d + \int_{t_{sp}}^{t_e(j)+\Delta} R(u)du, \qquad (5)$$

$$E(t_e(j)^-) \geq \int_{t_e(j)}^{t_{sp}} R(u)du - B_d + MSR \cdot (t_d(j) - t_{sp}). \qquad (6)$$

Note that these constraints have to be satisfied for all pictures j that coexist in decoder 90 with data from video source 70. Furthermore, if the channel rate of encoder 10 is known, these constraints can be computed in advance. This is important since it has a direct impact on encoded video quality.

If encoder 10 is a constant bit rate encoder, the above expression (6) simplifies to:

$$E(t_e(j)^-) \geq R(t_{sp}-t_e(j))-B_d+MSR\cdot(t_d(j)-t_{sp}), \quad (7)$$

where R is the constant bit rate.

The lower bound given by the right hand side of the expression in equation 7 is illustrated in FIG. 3 with a couple of examples, one for the case where MSR is greater than R and the second MSR is less than R. When the lower bound on the encoder buffer is negative, the constraint is automatically satisfied.

This additional constraint on the encoder buffer has to be satisfied from $t_{sp}-\Delta$ to $t_e(i)$.

Decoder Buffer Underflow

Figure 4:
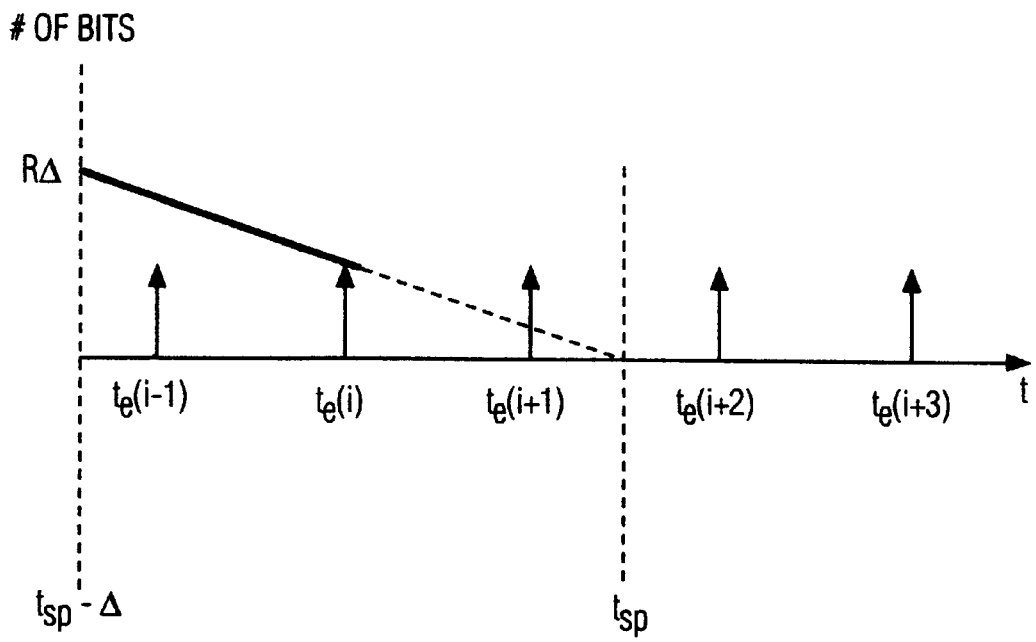
FIG. 4 is a graph illustrating a preferred method of calculating the upper occupancy boundary of an encoder buffer to prevent overflow therein and underflow in the decoder buffer, all of which are constructed in accordance with the present invention.

Referring now to FIG. 4, it is preferable to ensure that all the data that is produced by the encoder prior to the last picture (and including the last picture) leaves the encoder buffer prior to the splice point. To ensure this, if you start at a point delta seconds prior to the splice point, from that point on the maximum of data that can be transmitted is $R\Delta$. The buffer is being emptied at a rate R and for a period of delta ($\Delta$) seconds. FIG. 4 illustrates at any instant of time the number of bits that can be transmitted at this point on to the splice point. The encoder buffer occupancy should not go above this value otherwise it will not be possible to transmit all the data.

In order to ensure that there is no decoder buffer underflow in the period from $t_{sp}$ to $t_{sp}+t_d(i)$, we need to ensure that the data generated in encoder 10 prior to the splice point $t_{sp}$ reaches decoder 90. Therefore, from the time $t_{sp}-\Delta$ until $t_e(i)^+$, the number of bits in the encoder buffer has to be limited by $$E(t) \leq \int_t^{t_{sp}} R(u)du, \quad \text{where } t_e(i)^+ \geq t \geq t_{sp}-\Delta. \quad (8)$$

As illustrated in FIG. 4, in the case of a constant bit rate encoder, this expression for the upper bound will be, $$E(t) \leq R\cdot(t_{sp}-t), \quad (9)$$

where R is the constant bit rate.

Figure 5:
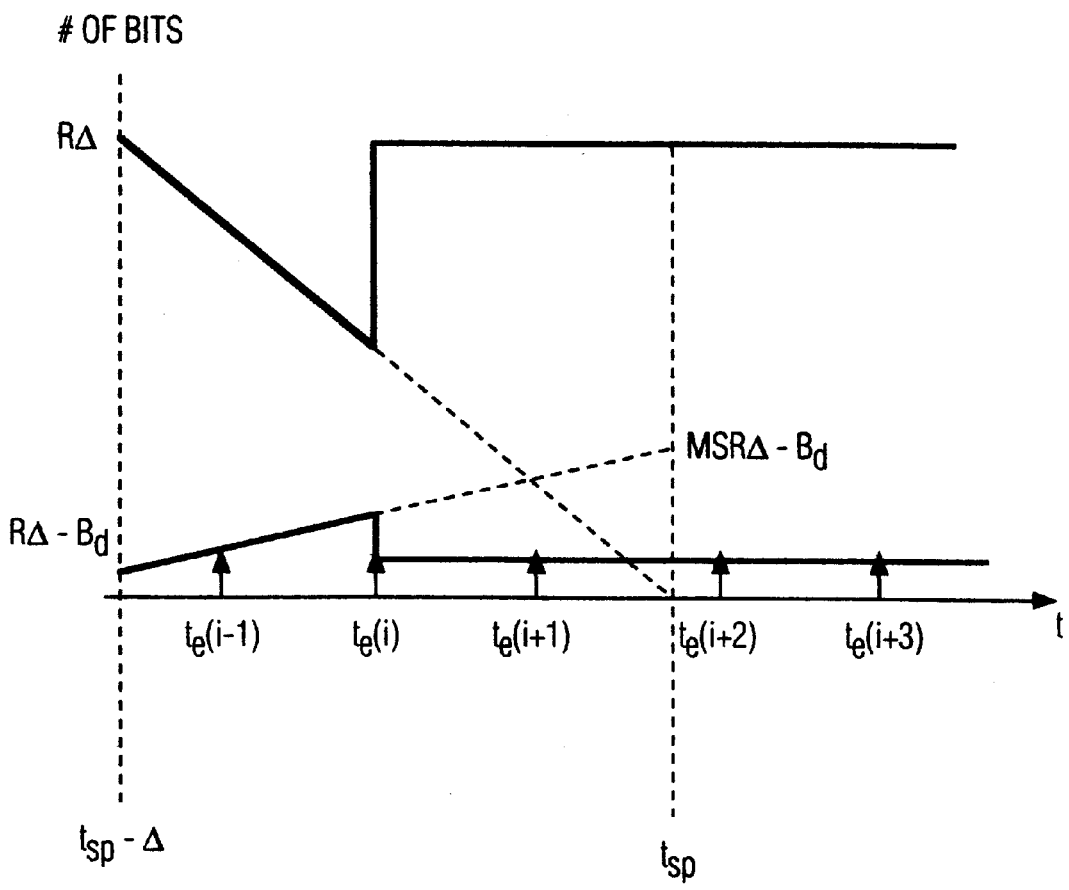
FIG. 5 is a graph illustrating both the upper and lower occupancy boundaries of the encoder buffer constructed in accordance with the present invention.

Reference is now made to FIG. 5 which illustrates the upper and lower bounds for encoder buffer 16 in order to satisfy the above identified constraints necessary for seamless splicing. In normal operation (in the absence of splice points), the lower and upper bounds of the encoder buffer are given by $\text{Max}(0, R\Delta-B_d)$ and $R\Delta$ respectively. In the neighborhood of a splice point, the buffer bounds are more constraining as shown in FIG. 5. These constraints take effect starting at time $t_{sp}-\Delta$. After the encoder produces the last picture that is to be transmitted prior to the splice point, the encoder buffer bounds return to the normal bounds as indicated at $t \geq t_e(i)$.

An additional requirement is that the last data bit from the i'th picture must leave encoder buffer 16 at $t_{sp}$. This is required by definition, since it is the presence of the splice flag in the packet containing the last byte of data from the i'th picture that defines the splice point. In the case of a constant bit rate ("CBR") encoder whose buffer is emptied at a constant bit-rate, this requires that at $t_e(i)^+$, the number of bits in the encoder buffer equals $R(t_{sp}-t_e(i))$ which is the upper bound on the encoder buffer occupancy at time $t_e(i)$ as shown in FIG. 5. This can be satisfied by zero-stuffing the encoder buffer up to that upper bound in a known manner. For variable bit rate ("VBR") encoders, this can be ensured in a variety of ways.

Rate Allocation in the Encoder

In MPEG encoders, rate allocation is typically performed by allocating a certain number of bits to a group of pictures ("GOP"). This target number of bits allocated to a GOP is usually the bit-rate multiplied by a ratio equal to the size of the GOP over the picture rate. This target number of bits for a GOP is then re-allocated among the pictures within the GOP. This rate allocation methodology can be represented through a few parameters—$\text{Target}_{GOP}$, $\text{Target}_I$, $\text{Target}_P$, and $\text{Target}_B$, where $\text{Target}_{GOP}$ is the target number of bits allocated to a GOP and $\text{Target}_I$, $\text{Target}_P$ and $\text{Target}_B$ are the corresponding targets for the I, P and B pictures respectively.

Figure 6:
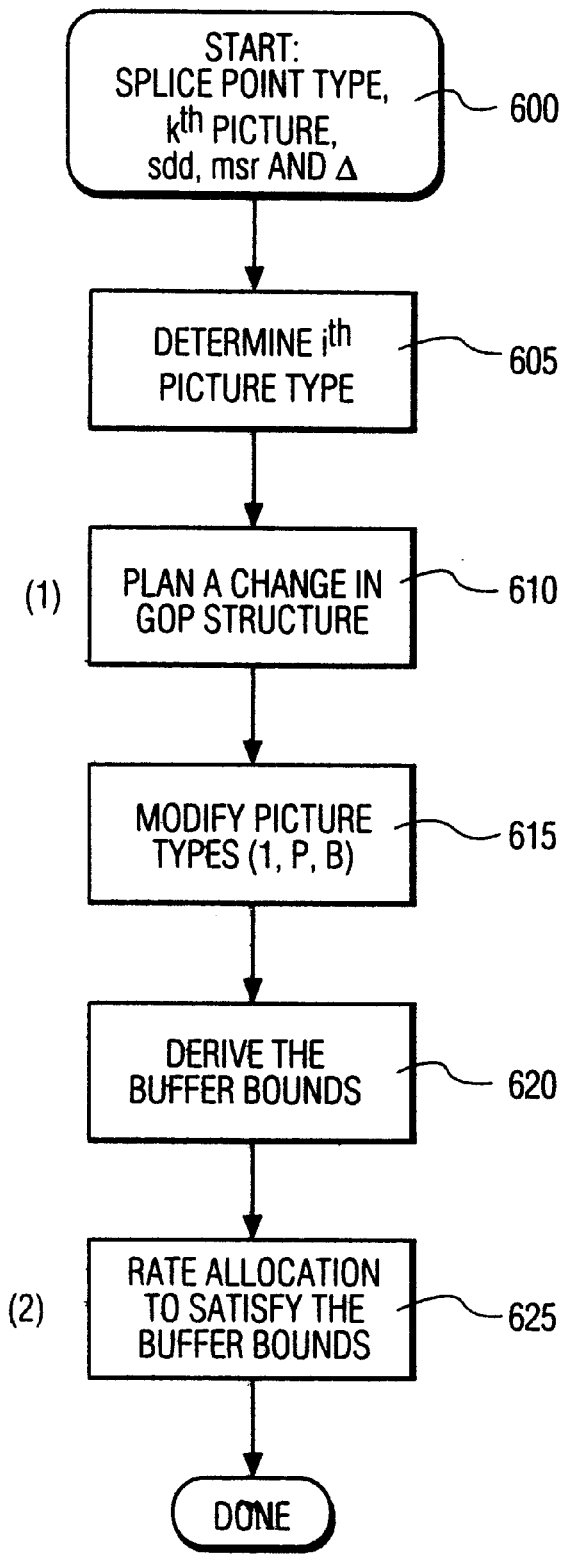
FIG. 6 is a flowchart setting forth a preferred method of the rate allocation in the encoder in accordance with the present invention.

Reference is now made generally to FIG. 6 in connection with the rate allocation of an encoder constructed in accordance with the present invention. Generally speaking, at the beginning of the sequence, the splice point is identified and the k'th picture, (where k is the index in display order of the last picture before the switching) is identified (step 600). Thereafter, the i'th picture, corresponding to the picture number in the coding order, is identified (step 605). At step 610 in the preferred method, the GOP structure change is planned. This step will be set forth in greater detail when reference is made to FIG. 8 below. At step 615, the I, B and P picture types are accordingly modified. Thereafter, the buffer bounds are derived as discussed above in the previous sections (step 620). Lastly, in step 625, the rate allocation is determined in order to satisfy the desired buffer bounds. This step will be set forth in greater detail when reference is made to FIG. 7 below.

This standard rate allocation can be modified in order to meet the buffer constraints set forth above and which are necessary to support splicing. They are based on the following idea: if the number of bits allocated to a GOP is actually used to code that GOP, the occupancy of the buffer just prior to the start of encoding that GOP will be equal to that just after encoding that GOP. If at time t, the number of bits in the encoder buffer E(t), an estimate of the number of bits in the encoder buffer at any future time can be estimated from the targets allocated to the individual pictures and the output rate of the encoder buffer.

Generally speaking, at the start of encoding every GOP, if the last picture prior to a splice point is to be coded in the upcoming GOP, the number of bits in the encoder buffer at time t is estimated and denoted by $\overline{E}(t)$. If $\overline{E}(t_e(i))$ meets the lower and upper bounds given by equations (4)–(7), the targets are not modified. If $\overline{E}(t_e(i)^-)$ is lower than the required lower bound, $\text{Target}_{GOP}$ is increased so as to make $\overline{E}(t_e(i)^-)$ equal to the lower bound. If $\overline{E}(t_e(i)^+)$ is greater than the required upper bound, $\text{Target}_{GOP}$ is decreased so as to make $\overline{E}(t_e(i)^+)$ equal to the upper bound. A required margin for safety can also be built into the adjustments that are made to $\text{Target}_{GOP}$.

Figure 7:
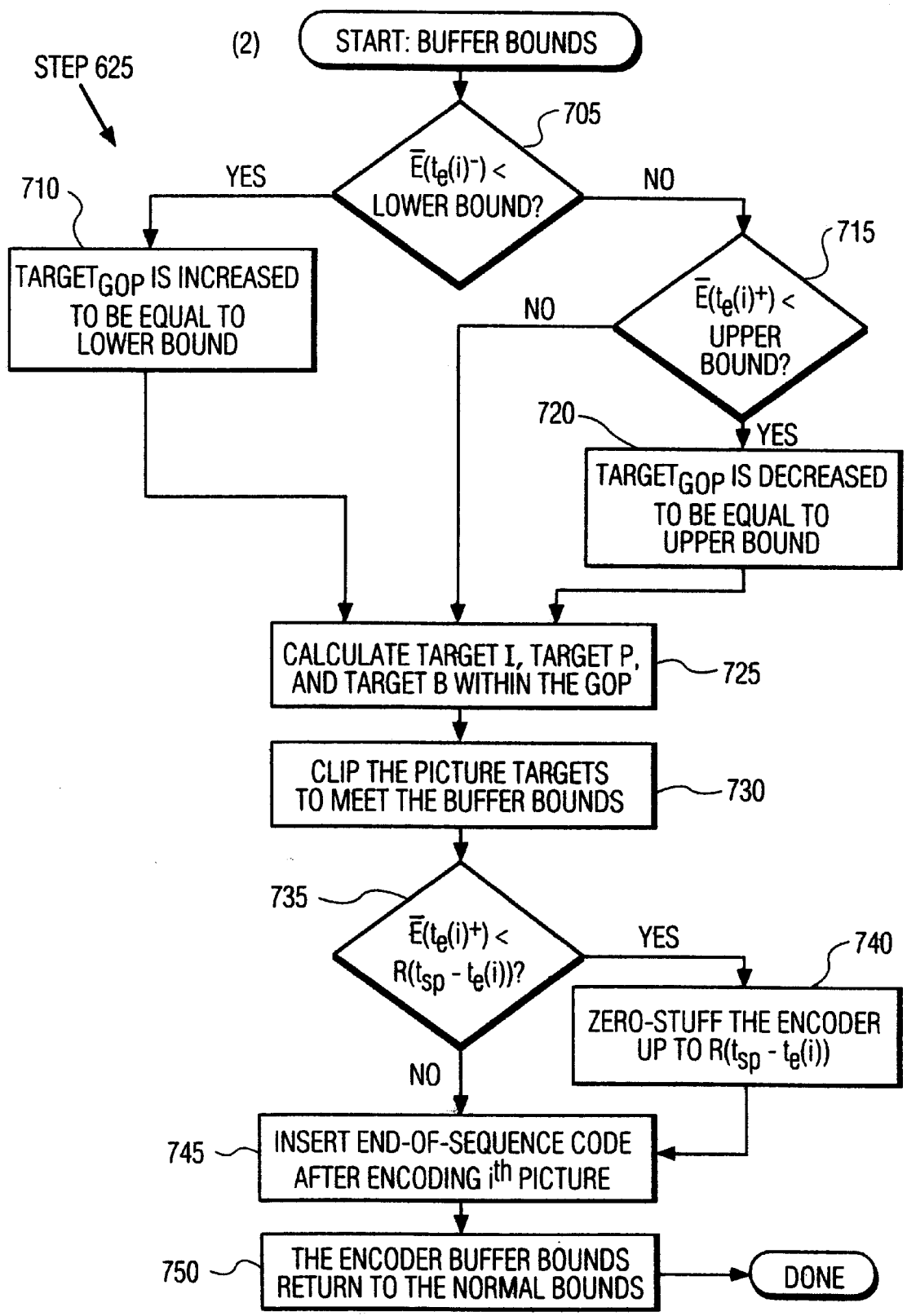
FIG. 7 is a still further detailed flowchart setting forth a preferred method of the rate allocation in the encoder in accordance with the present invention.

Reference is now made to FIG. 7 to more particularly illustrate in detail a preferred method of the rate allocation step set forth in step 625 of FIG. 6. In particular, in step 705, it is first determined whether $\overline{E}(t_e(i)^-)$ is less than the lower bound. If it is, the $\text{Target}_{GOP}$ is increased so as to make $\overline{E}(t_e(i)^-)$ equal the lower bound (step 710). If $\overline{E}(t_e(i)^-)$ is not less than the lower bound, it is determined whether $\overline{E}(t_e(i)^+)$ is greater than the upper bound (step 715). If the answer is yes, then $\text{Target}_{GOP}$ is decreased so as to make $\overline{E}(t_e(i)^+)$ equal the upper bound (step 720). If $\overline{E}(t_e(i))$ is neither greater than the upper bound nor lower than the lower bound, then $\text{Target}_I$, $\text{Target}_B$, and $\text{Target}_P$ within the GOP are calculated (step 725). Thereafter, the picture targets are clipped to meet the aforementioned buffer bounds (step 730).

At step 735, it is to be determined whether $\overline{E}(t_e(i)^+)$ is less than $R(t_{sp}-t_e(i))$. If the answer is yes, then at step 740, the encoder is zero-stuffed up to $R(t_{sp}-t_e(i))$. An end-of sequence code is inserted after the encoding of the i'th picture (step 745). Lastly, the encoder buffer bounds return to the bounds which are $\text{Max}(0,R\Delta-B_d)$ and $R\times$. (step 750).

This modified $\text{Target}_{GOP}$ is used to calculate $\text{Target}_I$, $\text{Target}_P$ and $\text{Target}_B$ within the GOP. These picture targets are then clipped so as to ensure that the buffer bounds are met. Thus, a two-step process is used to ensure that the buffer constraints are met. The first-step is in the calculation of the GOP target and the second in the calculation and clipping (if any) of the picture targets.

The target for the GOPs can be changed well in advance of the splice point (if the encoder knows about the occurrence of the splice point) so as to smoothly transition the buffer occupancy to the desired state. This can be done, since as stated earlier, the buffer constraints imposed by splicing, have no time-dependencies and can be calculated in advance if the channel rate of the encoder is known.

Picture Accurate Splicing in MPEG

MPEG uses three types of pictures—I, P and B. In order to accommodate the type of motion prediction utilized in B pictures, MPEG encoders reorder the pictures, thereby resulting in a picture encoding order that differs from the display order. Typically, MPEG encoders use two parameters termed N and M, in the encoding process. $N-1$ is the number of pictures between two consecutive I pictures, while $M-1$ is the number of B pictures between two consecutive non-B pictures. As an example, if $N=12$, $M=3$, and the pictures are indexed by their picture numbers, a typical encoding pattern is as illustrated below:

$I_2\ B_0\ B_1\ P_5\ B_3\ B_4\ P_8\ B_6\ B_7\ P_{11}\ B_9\ B_{10}\ I_{14}\ B_{12}$

In a real-time encoder encoding a real-time video source (where the video pictures enter the encoder in the order in which they are to be displayed), the following is a typical timing diagram for the encoding pattern illustrated above.

Index of input picture 2 3 4 5 6 7 8 9 10 11 12 13 14

Encoding Pattern $I_2\ B_0\ B_1\ P_5\ B_3\ B_4\ P_8\ B_6\ B_7\ P_{11}\ B_9\ B_{10}\ I_{14}$ Thus, the reference pictures $(2, 5, 8, 11, 14, \ldots)$ get encoded at the time at which they enter the encoder while the B pictures $(0, 1, 3, 4, 6, 7, 9, 10, \ldots)$ get stored in picture buffers for later encoding.

Consider such an encoder and a case where a seamless splice point is desired after picture 8. The splice point can be inserted after the encoding of picture 7. However, consider a case where a splice point is desired after picture 9. If the splice point is inserted after the encoding of picture 9, picture 11 would also have been encoded prior to the splice point. This is not desirable since in the presence of a splice operation occurring at this splice point, picture 11 would reach the decoder, and be decoded and displayed. This results in a picture that occurs in display-order after the splice time getting displayed. Moreover, picture 10 would be missing. In a compliant non-low-delay (low_delay field has a value '0') MPEG bitstream, there are no "missing" pictures, and this stream would therefore not be compliant. The solution is to convert picture 9 to a P picture, as illustrated below:

Index of input picture 2 3 4 5 6 7 8 9 10 11 12 13 14

Encoding Pattern $I_2\ B_0\ B_1\ P_5\ B_3\ B_4\ P_8\ B_6\ B_7\ P_9\ P_{12}\ B_{10}\ B_{11}$ Thus, the last picture in display-order prior to a splice point is a reference picture. The last picture in coding-order prior to a splice point is either the last of a series of B pictures, or a reference picture (only in the absence of B pictures in the immediate neighborhood).

Figure 8:
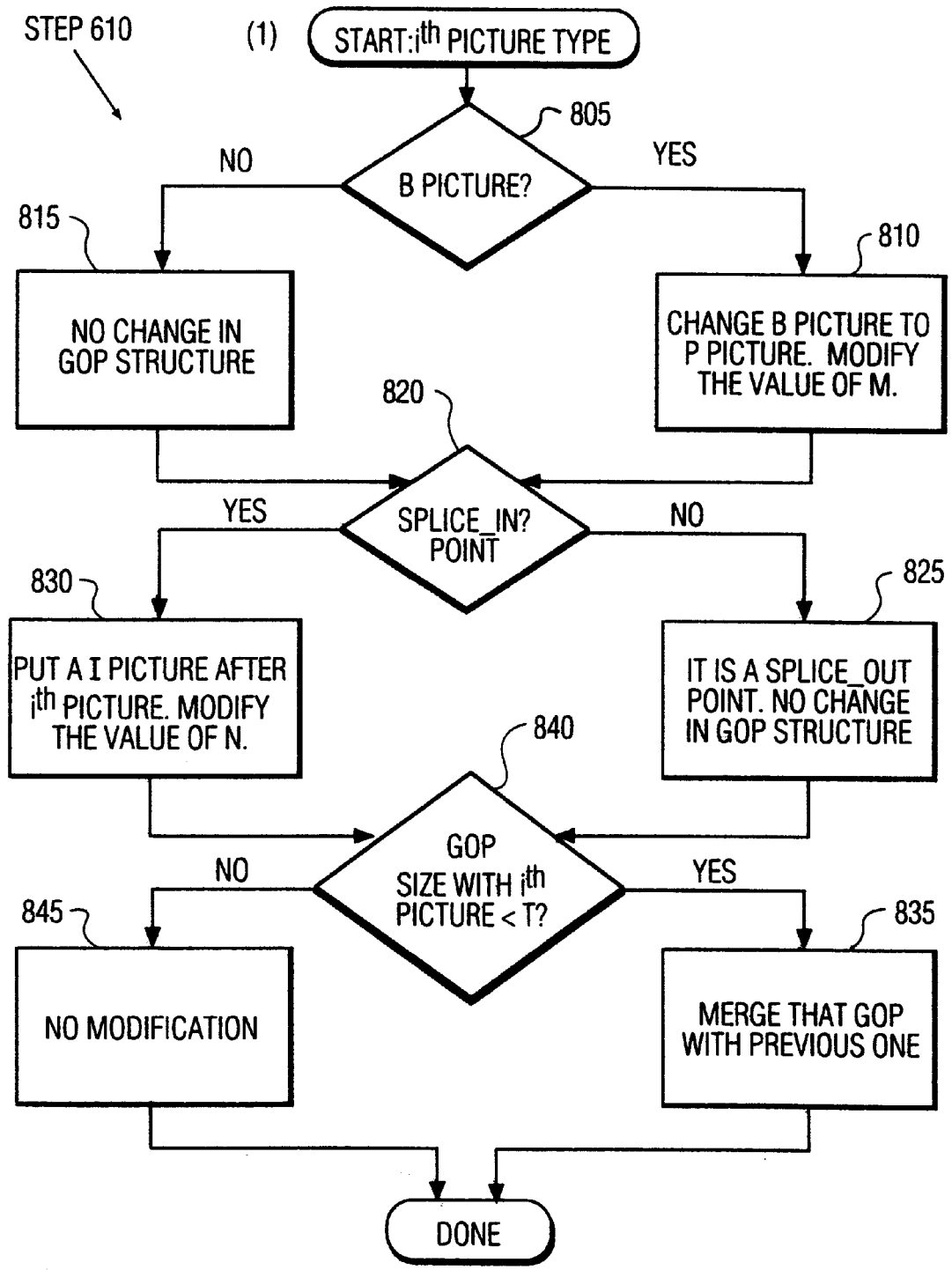
FIG. 8 is yet a further detailed flowchart setting forth a preferred method of picture accurate splicing in accordance with the present invention.

Reference is made now to FIG. 8 which depicts in detail a preferred method of motion prediction set forth herein. Specifically, the steps set forth in FIG. 8 are a more detailed delineation of step 610 of FIG. 6. As illustrated, therein, at the beginning of this subroutine, it is first determined whether the picture type of the i'th picture is a B picture (step 805). If it is, the B picture is changed to a P picture and the value of M, which, as stated above is the number of B pictures between two P pictures, is modified (step 810). If in step 805 it is determined that the picture is not a B picture, there will be no change in the GOP structure (step 815). Thereafter, it is determined whether there is a splice-in point, defined herein as the point in the bitstream at which there can be a switch to another bitstream or at which another bitstream can join (step 820). If it is not a splice-in point, then it is a splice-out point which means it is a point in the bitstream where it is possible only to switch to another bitstream (step 825). If on the other hand, it is a splice-in point, an I picture is placed after the i'th picture and the value of N (the number of pictures between two consecutive I pictures) is modified (step 830).

Thereafter, as illustrated in FIG. 8 at step 840, it is determined whether the GOP size with the i'th picture is less than a threshold (T), generally equal to N/2. (T) is the threshold value used to decide to merge the upcoming GOP to the previous GOP for preserving video quality. If the GOP size is less than threshold (T), the current GOP is merged with the previous GOP (step 835) and N is modified accordingly. If the determination at step 840 is negative, there is to be no modification (step 845).

By performing the method set forth in accordance with the present invention, seamless switching between a plurality of selected encoders can be achieved. Moreover, by providing a encoder/decoder system that can perform the method set forth in the present invention, an improved splicing arrangement is provided for seamless switching. Additionally, the method set forth in the present invention achieves an improved concatenation of digitally compressed bit streams. Moreover, the method set forth in accordance with the present invention achieves seamless switching between a plurality of selected encoders with a minimal amount of required circuitry, thereby also requiring a minimal amount of processing. Still further, the method as set forth in the present invention for seamless switching maintains the quality of the video signal and is fully adaptable for and meets all the requirements set forth in the MPEG standard. Additionally, the output of the encoders can be stored on servers or other storage devices, played out at a future time and then spliced.

We claim:

1. A method of picture accurate splicing when the last picture in display order prior to a splice point is a B picture, said method comprising the steps of:

identifying the last picture in display order prior to a splice point;

changing the type of the identified last picture to one of an I or P picture;

determining the number of pictures in a current GOP containing the identified picture;

determining if the number of pictures in the current GOP is less than a threshold and if so, concatenating the current GOP with a previous GOP; and terminating the current GOP with the identified picture if the splice point is a splice-in-point.

2. A method of picture accurate splicing when the last picture in display order prior to a splice point is one of an I or P picture, said method comprising the steps of:

identifying the last picture in display order prior to a splice point;

determining the number of pictures in a current GOP containing the identified picture;

determining if the number of pictures in the current GOP is less than a threshold and if so, concatenating the current GOP with a previous GOP; and terminating the current GOP with the identified picture if the splice point is a splice-in-point.

* * * * *